United States Patent [19]

Seltzer

[11] 4,121,149

[45] Oct. 17, 1978

[54] TIMING CONTROL FOR AC POWER CIRCUIT

[75] Inventor: Daniel A. Seltzer, Richardson, Tex.

[73] Assignee: DAS Design Corporation, Dallas, Tex.

[21] Appl. No.: 755,454

[22] Filed: Dec. 30, 1976

[51] Int. Cl.² ............................................. H05B 9/06
[52] U.S. Cl. ............................... 323/19; 219/10.55 B; 323/24
[58] Field of Search ................. 323/22 SC, 24, 19, 34; 219/10.55 B

[56] References Cited

U.S. PATENT DOCUMENTS

| 3,103,618 | 9/1963 | Slater | 323/22 SC |
| 4,041,267 | 8/1977 | Wechsler | 323/24 X |

Primary Examiner—A. D. Pellinen
Attorney, Agent, or Firm—Peter J. Murphy

[57] ABSTRACT

A triac functions as an electronic switch to intermittently connect the AC power circuit to a load, and is directly connected to the output of a 1422 integrated circuit timer which turns the triac on and off according to a controlled cycle. The timer functions as an astable multivibrator which alternately produces high or low output voltages responsive to movement of a control voltage between high and low trigger voltage levels. A charging circuit, including a capacitor and variable resistor, is connected directly between the DC power supply and the timer input to produce an increasing control voltage; and the control voltage is discharged through the timer to produce a decreasing control voltage which determines the duty cycle. The duty cycle is variable by means of a variable resistor in the charging and discharge circuits; and the control includes calibration for the time base.

12 Claims, 3 Drawing Figures

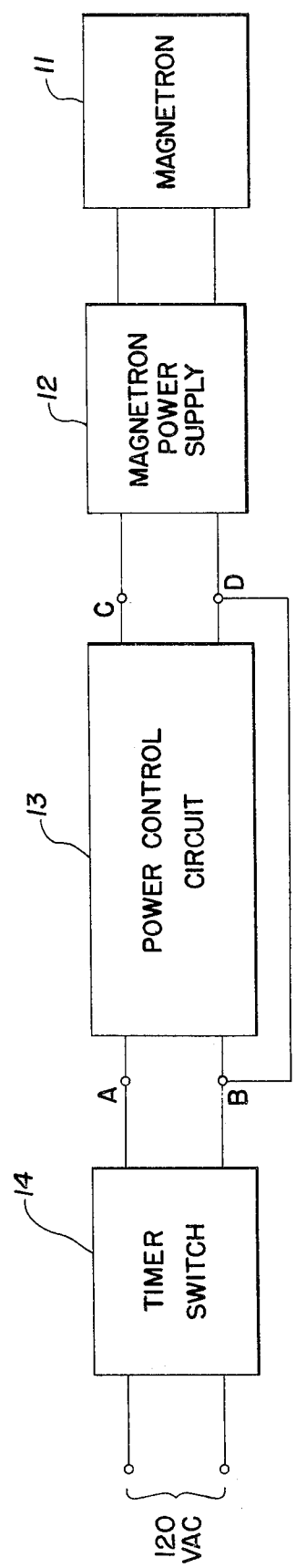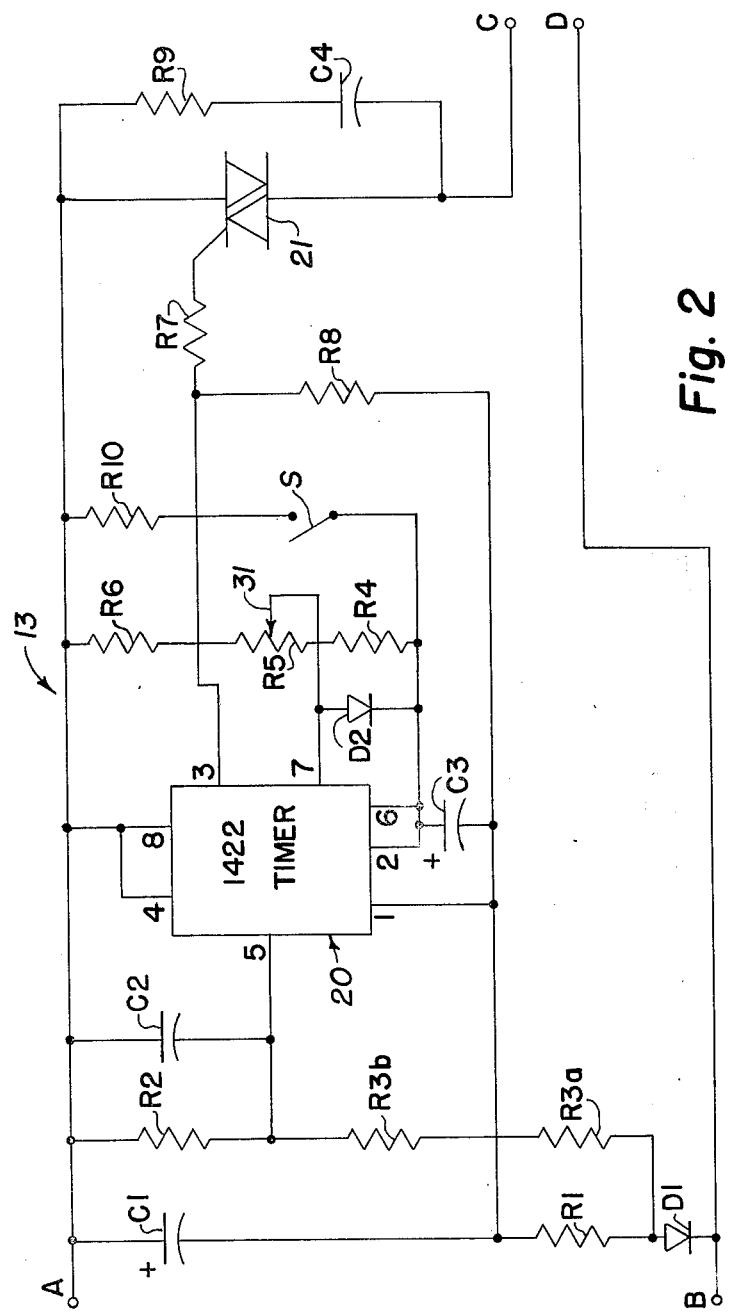
Fig. 1
Fig. 2

TIMING CONTROL FOR AC POWER CIRCUIT

BACKGROUND AND SUMMARY OF THE INVENTION

This invention relates to a control circuit for an AC power line; and more particularly to a timing control circuit for connecting a load to an AC power line for intermittent, selectively controlled time intervals.

This invention is concerned particularly with a control for a microwave oven, wherein the microwave generator is typically a magnetron. Since a magnetron cannot be operated efficiently or practically at varying power levels, the oven cannot be controlled by varying the line power to the magnetron. The oven may be controlled by applying power to the magnetron intermittently and cyclically, and by varying the times of the on-and-off portions of each power cycle. For control of a magnetron, the length of an on-off power cycle is referred to as the "time base". The time base of an oven control is selected and fixed by the manufacturer and may, for example, be as short as 1 second or as long as 30 seconds. The "duty cycle" of the control is the portion or percent of the time base cycle during which the magnetron is "on", and is selected by the user. The duty cycle may have a selectable range of from 25% to 100% of the time base.

While oven controls of this general type are known, because of the designed circuitry of the controls there may be considerable variation of either the time base or the duty cycle. It will be apparent that significant variations of either the time base or the duty cycle will have a considerable effect on either the cooking temperature or the cooking speed or both.

A principal object of this invention therefore is to provide a reliable and accurate control circuit, for variable control of a duty cycle during which AC power is applied to a load.

Another object of this invention is to provide such a circuit including means for calibration of the time base.

A further object of this invention is to provide such a control circuit which requires a minimum of components, resulting in ease and economy of manufacture.

Still another object of this invention is to provide such a circuit requiring minimum power for operation of the control, and which provides reliable wattage levels throughout the circuit for precision operation of the circuit.

A still further object of the invention is to provide such a control circuit which provides for precision control of duty cycle between 25% and 96% limits and also provides for 100% duty cycle operation.

These objects are accomplished in circuitry for variable control of an AC power circuit which includes the following subcircuits. A first timing circuit means is responsive to varying DC input control voltage levels for producing, alternately high and low DC output voltage levels; and includes input control means for comparing an input control voltage with upper and lower trigger voltage levels, for switching the circuit output between high and low voltage levels. A second power supply circuit means is coupled to the AC power circuit for producing a selected Vcc supply voltage for the first circuit means and other circuit means. A third synchronization circuit means is coupled to the AC power circuit for producing a DC threshold voltage level with superimposed negative-going half-wave pulses, synchronized with the AC power circuit; and this synchronization circuit means is coupled to the timing circuit means to provide the upper trigger voltage level for the timing circuit means. A fourth switching circuit means includes a DC operated electronic, alternating current switch for selectively opening and closing the AC power circuit. The operating circuit of the switch is connected between the positive side of a DC power supply and the output of the timing circuit. A fifth control voltage circuit means produces an input control voltage which increases or decreases at a selected rate. The input control voltage circuit means includes variable resistance means connected between the positive side of the DC power supply and the timing circuit input control means, and a capacitor connected between the timing circuit input control means and the negative side of the DC power supply. The variable resistance means includes a wiper contact connected to the timer input control means by a series connected diode which passes current to the input control means, and also connected to timing circuit grounding means. The timing circuit grounding means functions to connect the wiper contact to the negative side of the DC power supply when the timing circuit output voltage level is low.

The novel features and the advantages of the invention, as well as additional objects thereof, will be understood more fully from the following description when read in connection with the accompanying drawings.

DRAWINGS

FIG. 1 is a diagrammatic illustration of circuitry for a microwave oven including the power control circuit of the present invention;

FIG. 2 is a schematic circuit diagram of the power control circuit of this invention.

DESCRIPTION OF THE PREFERRED EMBODIMENT

Figure 3:
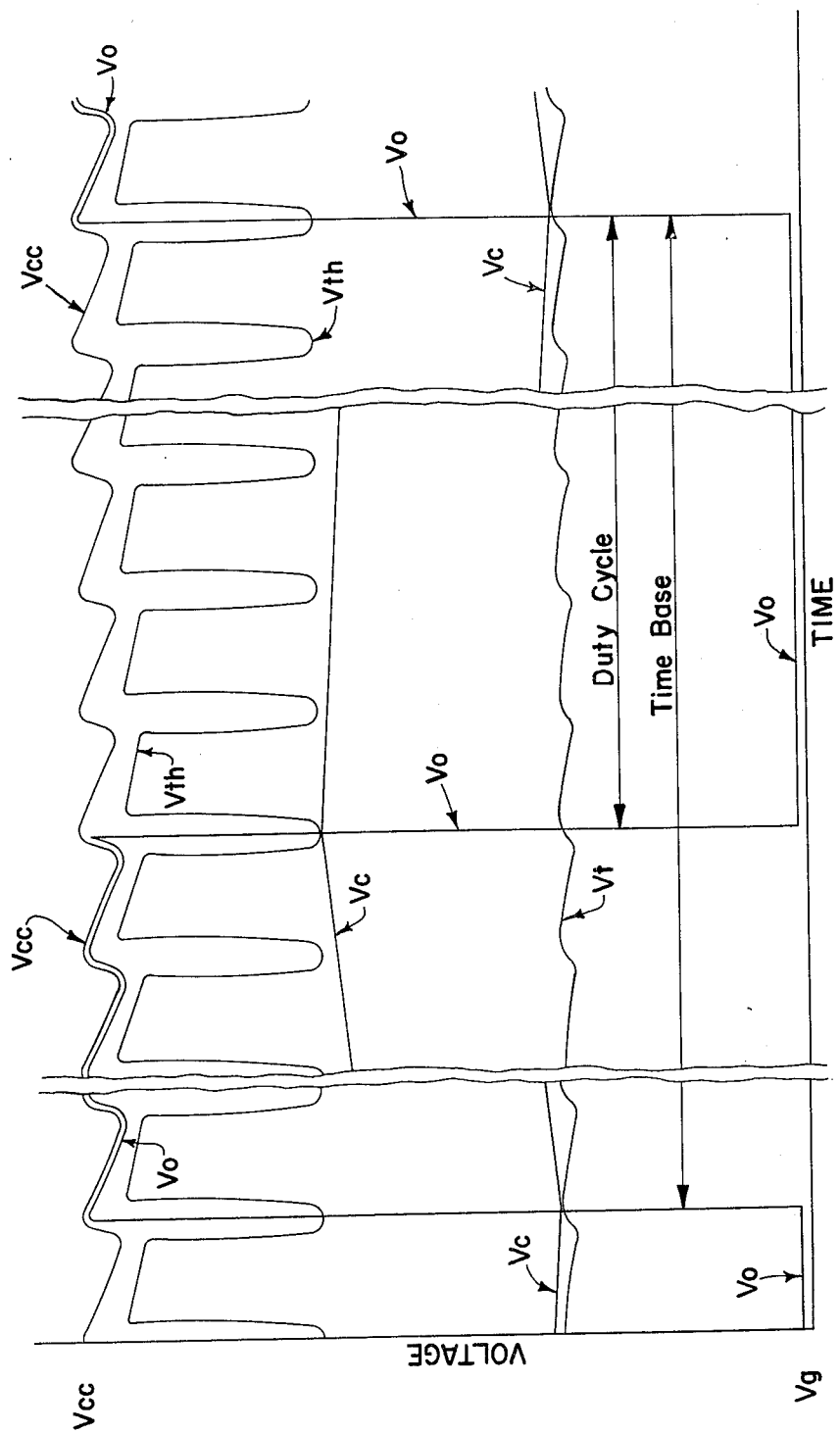
FIG. 3 is a diagrammatic illustration of certain circuit voltage wave forms of the power control circuit.

The power control circuit of the present invention is illustrated and described as part of the control circuitry for a microwave oven which is connected to a conventional 120 volt AC power line. FIG. 1 illustrates diagrammatically the overall circuit for a microwave oven including a magnetron 11 powered by its power supply 12. The power to the magnetron power supply 12 is controlled directly by the power control circuit 13 which is the control circuit of this invention. The power to the control circuit 13 is controlled by a timer switch 14, which is a clock controlled timer switch to determine the overall oven time, or the time that the power control circuit 13 is energized or connected to the power line.

Referring to the power control circuit 13, the terminals A and B are the line terminals, and the terminals C and D are the load terminals. Terminals B and D may be a common terminal. A principal subcircuit is the time circuit 20 which is a Motorola XC 1422 integrated circuit timer (also known as an MC 1422 timer). This timer circuit 20 functions as an astable multivibrator which is free running at a frequency determined by the selected time base for the control.

A DC power supply, for the timer 20 and other portions of the control circuit, consists of a half-wave rectifier provided by diode D1, dropping resistor R1 and capacitor C1, which are connected in series across the line terminals A and B. The positive side of the power supply Vcc (15 volts) is connected to pins 4 and 8 of the timer 20; and the negative side of power supply (ground voltage Vg) is connected to pin 1 of the timer 20.

The control component for selectively passing AC power to the load is a triac 21, which functions as an electronic on-off switch for alternating current. The operating circuit for the triac is connected between Vcc and output pin 3 of the timer 20, including resistor R7 in series with the triac. The triac 21 is off when the timer output is high, since no DC current flows through the triac; and the triac is on when timer output is low allowing current to flow through the triac and series connected resistor R7 to pin 3.

The time base and duty cycle are controlled by an increasing and decreasing control voltage impressed at timer pins 2 and 6 as it moves between lower and upper trigger voltage levels which are determined by the timer and external circuitry. The lower trigger voltage level Vt is fixed at one third Vcc, for example, as determined by internal circuitry of the timer 20. The upper trigger voltage level Vth, referred to as variable threshold level, is determined by the circuitry establishing a voltage at pin 5 of the timer 20; and this threshold reference voltage is maintained at about two-thirds Vcc for example.

To now summarize briefly the operation of the control circuit during one operating cycle (time base) the circuit switches between charge mode and discharge mode, the discharge mode representing the duty cycle. Various voltage levels at different points in the control circuit are illustrated diagrammatically in FIG. 3. During the charge mode, the timer output voltage Vo at pin 3 is high, the timer discharge pin 7 is open, and the control voltage Vc impressed at pins 6 and 2 is increasing to the threshold voltage level vth. When this control voltage reaches the threshold voltage level, the circuit switches to the discharge mode wherein the output voltage at pin 3 goes low, the timer discharge pin 7 is connected to Vg, and the control voltage Vc impressed at timer pins 2 and 6 is decreasing towards the trigger voltage level Vt. When the control voltage reaches the trigger voltage level, the circuit switches again to the charge mode, with the output voltage at pin 3 going high.

A preferred circuit having a time base of 12 seconds may include components having the values indicated in the following table:

| | |
|---|---|
| R1 | 750ohm |
| R2 | 10K |
| R3a | 180K |
| R3b | 39K |
| R4 | 180K |
| R5 | 590K |
| R6 | 10K |
| R7 | 200ohm |
| R8 | 270ohm |
| R9 | 200ohm |
| R10 | 10K |
| C1 | 220mf/16v |
| C2 | .1mf/100v |
| C3 | 22mf/16v |
| C4 | .1mf/200v |
| D1 | 200v, 1a |
| D2 | 100v, 100ma |
| 21 | triac 15a, 200v |

Resistors R2, R3a and R3b are a voltage divider which establishes the threshold voltage Vth at pin 5, including negative going sync pulses which are formed by these resistors and the diode D1. This threshold reference voltage is free to move between Vcc and ground without effecting the trigger voltage Vt; and the threshold voltage is held close to Vcc except during the sync intervals when the negative going sync pulses (at 60 CPS) decrease to about two-thirds Vcc. Resistor R3b is a calibrating resistor which may be changed to move the voltage Vth up or down. Capacitor C2 delays the sync pulses slightly to lessen the turn-on spike that would take place at the peak voltage.

Capacitor C3 is the time base capacitor and functions together with the series connected resistors R4, R5 and R6 to fix the time base. For improved precision of the control circuit, resistor R3b is a calibrating resistor which functions to calibrate the time base for the circuit. Calibration of this resistor, varies the threshold reference voltage at pin 5 relative to ground Vg, and therefore relative to the trigger voltage Vt, to provide for precise setting of the time base.

The duty cycle is controlled by the resistor R4, R5 and R6, the wiper contact 31 for the variable resistor R5, the diode D2, and pin 7 of timer 20. During the charge mode of the timer 20, the pin 3 output voltage is high, and pin 7 is an open circuit. During this charge mode, the capacitor C3 is charged by current flowing through a charging circuit which includes resistor R6, a selected portion of resistor R5, wiper contact 31 and diode D2. This increasing control voltage Vc, impressed at timer pins 2 and 6, is compared within the timer 20 to the negative going sync pulses of the threshold voltage Vth impressed at pin 5. As soon as this control voltage exceeds the threshold sync voltage, the timer switches to the discharge mode wherein pins 3 and 7 both go to low voltage Vg, and sink current. It will be seen then that if the wiper contact 31 is positioned to remove any portion of resistor R5 from this circuit, the minimum charge time will be effected by the resistor R6; and if all of resistor R5 is connected in this circuit, the maximum charge time will be effected.

Now in the discharge mode the capacitor C3 discharges through a discharge circuit which consists of resistor R4, a selected portion of resistor R5, the wiper contact 31, and timer pin 7 which sinks current. The discharge mode time is the duty cycle, during which pin 3 sinks current flowing through the triac 21 and resistor R7, thereby turning the triac on to open the AC power circuit to the load. It will be seen then that this discharge time or duty cycle will be a minimum when the wiper contact is positioned to remove any portion of resistor R5 from the discharge circuit, and will be a maximum when the wiper contact 31 is positioned to place the whole of resistor R5 in series with the resistor R4. The discharge mode is effective until the control voltage decreases to the trigger voltage level, at which time the timer circuit again switches to the charge mode.

In practice resistors R4, R5 and R6 are selected so that the resistor R4 determines a minimum duty cycle of about 25% and the resistor R6 determines a maximum duty cycle of about 96%.

To effect a 100% duty cycle, the switch S is closed. The capacitor C3 is then continuously charged through resistor R10, with the effect that when the control voltage Vc exceeds the threshold voltage Vth to switch the timer to the discharge mode, the control voltage will not decrease to the trigger voltage level Vt; and therefore the timer will remain in the discharge mode producing the 100% duty cycle.

The resistor R9 and capacitor C4 provide a snubber circuit connected in parallel with the triac 21 to protect the triac against high peak voltages. The resistor R7 also protects the triac 21 by limiting the driving gate current flowing through the triac to pin 3 when the triac is on.

The resistor R8 coacts with the half-wave rectifier to maintain the power supply voltage level Vcc at all times. When the triac is on, current drain between the Vcc and Vg is provided through the triac and resistor R7 to pin 3 which is at Vg level. When pin 3 is high (Vcc), current drain is provided through the resistor R8.

OPERATION

The operation of the control circuit 13 will be apparent from the foregoing description. To select a 100% duty cycle, the switch S is closed to maintain the timer circuit 20 continuously in the discharge mode so that the triac remains on.

To select a duty cycle between 25% and 96% for example, the switch S is open and the wiper contact 31 is positioned as desired. To select the 25% duty cycle, the wiper arm is positioned to place all of resistor R5 in the charge circuit and remove it from the discharge circuit. For maximum duty cycle the wiper contact is positioned to place all of resistor R5 in the discharge circuit and to remove it from the charge circuit. Positioning the wiper contact at selected intermediate positions will select a duty cycle between the limits of 25% and 96%. The overall oven time is, of course, controlled by the clock timer switch 14.

FEATURES AND ADVANTAGES

A feature of the control circuit of the invention is that the charge circuit for the timer control is connected directly between Vcc and the timer input (pins 2 and 6), and is therefore independent of the timer output. This provides more precise timing at the charging modes, and therefore more precise control of the time base and of the duty cycle.

Another feature of the invention is that the timer output is connected directly to the triac. This means that the triac is turned on immediately and with a minimum power requirement. The fast triac response means that the magnetron tube is turned on faster, and this inherently results in a more precise duty cycle.

An overall feature and advantage of the invention is the precise control of time base and duty cycle which results in part from the features discussed immediately above, and from other circuit features. While the time base is determined by resistors R4 and R5, and R6, and capacitor C3, it is also a function of precise control of the power supply Vcc. This is maintained constant by circuits which have been described. An important control feature is the calibrating resistor R3b by means of which the threshold voltage level Vth can be slightly varied relative to the trigger voltage level Vt to provide precise control of both time base and duty cycle.

A further feature of the invention is that pin 3 is loaded equally during the charge and discharge modes. In other control circuits where the pin 3 is loaded unequally there is considerable variation of the time base from the selected time. With the circuit of the present invention, the variation from the fixed time base is minimal.

Another feature and advantage of the invention is that the control circuit 13 is constructed with fewer parts providing for ease and economy of production. Ancillary to this is the single triac control for the AC power, and the ancillary minimum power requirement for turning the triac on. A related feature of the overall control circuit is that it provides reliable wattage levels.

An overall feature and advantage of the control circuit is the precise control of a variable duty cycle ranging between low and high limits of 25% to 96%.

While the preferred embodiment of the invention has been illustrated and described, it will be understood by those skilled in the art that changes and modifications may be resorted to without departing from the spirit and scope of the invention.

What is claimed is:

1. Circuitry for variable control of an AC power circuit comprising
   a first timing circuit means responsive to varying DC input control voltage levels for producing, alternately, high and low DC output voltage levels; said timing circuit means including an output, an input for a control voltage, and means for comparing an input control voltage with upper and lower trigger voltage levels for switching the timing circuit output between high and low voltage levels;
   a second power supply circuit means, coupled to the AC power circuit, for producing a selected DC supply voltage for said first circuit means and other circuit means;
   a third switching circuit means including a DC operated electronic, alternating current switch for selectively opening and closing said AC power circuit; the DC operating circuit for said switch being connected between the positive side of said DC power supply and said timing circuit output;
   a fourth control voltage circuit means for producing a control voltage which increases or decreases at a selected rate; said control voltage circuit means including variable resistance means connected directly between the positive side of said DC power supply and said timing circuit input, and a capacitor connected between said timing circuit input and the negative side of said DC power supply; said variable resistance means including a wiper contact connected to said timer circuit input through a series connected diode passing current to said input, and connected to a timing circuit discharge terminal; said timing circuit discharge terminal functioning to connect said wiper contact to the negative side of said DC power supply when said timing circuit output voltage level is low.

2. Control circuitry as set forth in claim 1
   said electronic switch comprising a triac; said operating circuit for said triac including resistance only connected between said triac and said timing circuit output.

3. Control circuitry as set forth in claim 2
   circuit means including a balancing resistor connecting the negative side of said power supply to said timer output terminal to provide power supply current drain when said timer output voltage level is high.

4. Control circuitry as set forth in claim 1
   balancing circuit means including a resistor connected between said timing circuit output and the negative side of said DC power supply, to provide power supply current drain when said timer output level is high.

5. Control circuitry as set forth in claim 1
   said control voltage circuit means including a charging circuit and a discharge circuit; said charging circuit including a series circuit consisting of a first section of said variable resistance means, the wiper contact of said variable resistance means, and said diode; and said discharge circuit consisting of the remaining second section of said variable resistance means, in series with said wiper contact and said timing circuit discharge terminal.

6. Control circuitry as set forth in claim 5 said timing circuit means comprising a Motorola XC 1422 integrated circuit timer, and said electronic switch comprising a triac.

7. Control circuitry as set forth in claim 3 said control voltage circuit means including series connected resistance means including said variable resistance means, a minimum duty cycle resistance means connected between said variable resistance means and said timer input, and a maximum duty cycle resistance means connected between said variable resistance means and said power supply source; said minimum duty cycle resistance means determining a minimum discharge time for said discharge circuit; and said maximum duty cycle resistance means determining a minimum charge time for said charging circuit.

8. Control circuitry as set forth in claim 5 said control voltage circuit including a 100% circuit; said 100% circuit including a series connected resistor and switch connected between the positive side of said DC power supply and said timer input, in parallel with said charging circuit; and said 100% circuit functioning to prevent decrease of said control voltage level to said lower trigger voltage level when said switch is closed.

9. Control circuitry as set forth in claim 1 a fifth threshold voltage circuit means, coupled to the AC power circuit and to said DC power supply, for producing a DC threshold voltage level with superimposed negative-going half-wave pulses; means coupling said threshold voltage circuit means to said timing circuit means to provide said upper trigger voltage level for said timing circuit means.

10. Control circuitry as set forth in claim 9 said threshold voltage circuit means comprising a voltage divider connected across said AC power circuit in series with a diode; and said voltage divider including a calibrating resistor in one leg, effective to shift the peak level of said negative-going half-wave pulses relative to the DC power supply voltage level.

11. Control circuitry as set forth in claim 10 said timing circuit means comprising a Motorola XC 1422 integrated circuit timer; the output of said voltage divider being connected to a threshold reference terminal of said timer; a capacitor connected between the positive side of said DC power supply and said threshold reference terminal in parallel with one leg of said voltage divider, said capacitor functioning to delay said negative-going pulses relative to said AC power circuit.

12. Control circuitry as set forth in claim 11 said electronic switch comprising a triac.

* * * * *